United States Patent [19]

Witman

[11] Patent Number: 4,515,921
[45] Date of Patent: May 7, 1985

[54] POLYCARBONATE COMPOSITIONS HAVING A HIGH IMPACT STRENGTH AND MELT FLOW RATE

[75] Inventor: Mark W. Witman, New Martinsville, W. Va.

[73] Assignee: Mobay Chemical Corporation, Pittsburgh, Pa.

[21] Appl. No.: 400,548

[22] Filed: Jul. 21, 1982

[51] Int. Cl.³ .............................................. C08L 69/00
[52] U.S. Cl. ..................................... 525/67; 525/146; 525/148
[58] Field of Search ........................... 525/67, 146, 148

[56] References Cited

U.S. PATENT DOCUMENTS

| Re. 28,723 | 2/1976 | Holder et al. | 260/873 |
| 3,655,824 | 4/1972 | Kato et al. | 260/873 |
| 3,742,088 | 6/1973 | Holder et al. | 260/873 |
| 4,086,296 | 4/1978 | Carty et al. | 260/857 |
| 4,180,494 | 12/1979 | Fromuth et al. | 260/49 R |
| 4,243,575 | 1/1981 | Myers et al. | 260/37 PC |
| 4,245,058 | 1/1981 | Liu | 525/148 |
| 4,251,647 | 2/1981 | Liu | 525/91 |
| 4,255,534 | 3/1981 | Liu | 525/91 |
| 4,257,937 | 3/1981 | Cohen et al. | 260/40 R |
| 4,260,693 | 4/1981 | Liu | 525/148 |
| 4,263,415 | 4/1981 | Liu | 525/148 |
| 4,263,416 | 4/1981 | Liu et al. | 525/148 |
| 4,269,964 | 5/1981 | Freitag et al. | 528/126 |
| 4,299,928 | 11/1981 | Witman | 525/67 |

Primary Examiner—Wilbert J. Briggs, Sr.
Attorney, Agent, or Firm—Gene Harsh; Lawrence S. Pope; Aron Preis

[57] ABSTRACT

The invention relates to thermoplastic aromatic polycarbonates which structural units are characterized by their end groups which are residues of

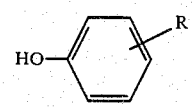

and is predicated on the surprising and unexpected findings that high melt flow polycarbonates of this type are rendered improved impact performance by admixing therewith small amounts of an impact modifier.

5 Claims, No Drawings

POLYCARBONATE COMPOSITIONS HAVING A HIGH IMPACT STRENGTH AND MELT FLOW RATE

FIELD OF THE INVENTION

The present invention relates to polycarbonate compositions and, more particularly, to the impact modification of certain polycarbonates which are characterized by their alkylphenyl end groups.

SUMMARY OF THE INVENTION

The invention relates to thermoplastic aromatic polycarbonates which structural units are characterized by their end groups which are residues of

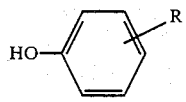

and is predicated on the surprising and unexpected findings that high melt flow polycarbonates of this type are rendered improved impact performance by admixing therewith small amounts of an impact modifier.

BACKGROUND OF THE INVENTION

Polycarbonates derived from reactions involving organic dihydroxy compounds and carbonic acid derivatives have found extensive commercial applications because of their excellent mechanical and physical properties. These thermoplastic polymers are particularly suited for molding articles for which impact strength, rigidity, toughness, thermal and dimensional stability as well as excellent electrical properties are required.

It is known that polycarbonates exhibit high notched Izod (ASTM D-256) impact values. These values, about 16 ft.lb/in., associated with failure in a ductile mode, are characteristic of test specimens thinner than about ⅛ inch. Thicker specimens, i.e., ¼ inch, fail in a brittle fashion at about 2.5 ft.lb/in.

Impact strength dependence on thickness gives rise to "critical thickness", a material parameter defined as that thickness at which a discontinuity occurs in the graphical representation of impact strength vs. specimen thickness. For example, polycarbonate based on bisphenol A having a melt flow rate of 3 to 6 grams/10 minutes at 300° C. (ASTM D-1238) exhibits a discontinuity at about 5.71 mm (225 mils). Articles of this material thinner than 225 mils will show ductile failure upon impact while thicker ones will fail in a brittle fashion.

This dependence of impact performance on thickness represents a drawback because it tends to limit the utility of polycarbonates by imposing restrictions on the design of molded articles.

Among the means disclosed in the art to improve the impact performance of polycarbonate resins, acrylic rubber interpolymer composites were disclosed in U.S. Pat. No. 4,299,928 and butyl acrylate rubbers were disclosed in U.S. Pat. No. 3,742,088.

Polycarbonates characterized by their alkylphenyl end groups are noted for their levels of resistance to hydrolysis and critical thickness which are improved over those of conventionally terminated polycarbonate resins. Alkylphenyl terminated polycarbonate resins are more particularly described in U.S. Pat. No. 4,269,964, incorporated herein by reference.

DETAILED DESCRIPTION OF THE INVENTION

The polycarbonate resins suitable in the practice of the presently disclosed invention are preferably prepared by the phase boundary process which has been described in, among others, H. Schnell, *Chemistry and Physics of Polycarbonates,* Polymer Reviews, Volume 9, Interscience Publishers, 1964, at page 33 et seq, incorporated herein by reference.

The di-(monohydroxyaryl)-alkanes or dihydroxybenzenes suitable in the preparation of polycarbonate resins in accordance with the invention may contain hetero atoms and may be substituted. Among the suitable diphenols are: hydroquinone, resorcinol, dihydroxydiphenyls, bis-(hydroxyphenyl)-alkanes, bis-(hydroxyphenyl) sulfides, bis-(hydroxyphenyl) ethers, bis-(hydroxyphenyl) ketones, bis-(hydroxyphenyl) sulfoxides, bis-(hydroxyphenyl) sulfones and $\alpha,\alpha'$-bis-(hydroxyphenyl)-diisopropylbenzenes, and their nuclear-alkylated and nuclear-halogenated compounds. These and other suitable diphenols are described, for example, in U.S. Pat. Nos. 3,028,365; 2,999,835; 3,148,172; 3,271,368; 2,991,273; 3,271,367; 3,280,078; 3,014,891 and 2,999,846, all incorporated herein by reference; in German Offenlegungsschriften (German Published Specifications) Nos. 1,570,703; 2,063,050; 2,036,052 and 2,211,956; French Patent Specification No. 1,561,518 and in the above-mentioned monograph by H. Schnell.

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, $\alpha,\alpha'$-bis-(4-hydroxyphenyl)-p-diisopropylbenzene, 2,2-bis-(3-methyl-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methyl-butane, 1,1-bis-(3,5-dimethyl-4-hydroxyphenyl)-cyclohexane, $\alpha,\alpha'$-bis-(3,5-dimethyl-4-hydroxy-phenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Mixtures of two or more of the suitable dihydroxy compounds mentioned above may also be used.

Briefly described in accordance with the phase boundary process, polycarbonate resins are obtained by reacting the aromatic dihydroxy compounds with an alkali metal hydroxide or with alkaline earth metal oxide or hydroxide to form the salt of the hydroxy compound. The salt mixture is present in an aqueous solution or suspension and is reacted with phosgene or with any of carbonyl bromide, bischloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product.

Small amounts, preferably between 0.05 and 2.0% relative to the molar amount of the diphenols employed, of branching agents may be added. Branching agents are compounds which are trifunctional or more than trifunctional, particularly those with three or more phenolic hydroxyl groups. Examples are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic acid ester, tetra-(4-hydroxyphenyl)-methane, tetra-[4-(4-hydroxyphenyl-isopropyl)-phenoxy]-methane and 1,4-bis-[(4',4'''-dihydroxytriphenyl)-methyl]-benzene. Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

In order to accelerate the reaction, catalysts such as tertiary amines, quaternary ammonium, phosphonium or arsonium salts and the like may be used. The reaction temperature should preferably be 0° C. to between about 40° C.

In the context of the present invention the polycarbonate resins prepared as above are characterized by their chain terminating groups which are residues of

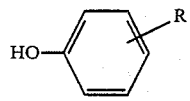

wherein R represents a branched alkyl radical consisting of 8 and/or 9 carbon atoms and in the alkyl radical R, the proportion of $CH_3$ protons is between about 47% and 89% and the proportion of the sum of the CH and $CH_2$ protons is between about 53% and 11% and wherein R can be in the o-position and/or p-position relative to the OH group, the upper limit of the ortho proportion being about 20%.

The amount of the compounds of formula I above used in the preparation of the polycarbonate resins of the invention is about 0.1 to 8% relative to the molar amounts of the diphenols. These compounds are introduced into the reaction solution described above.

The molecular weight (weight average) of the polycarbonate resins of the invention is between about 10,000 and 200,000, preferably between 20,000 and about 80,000.

A more detailed description respecting the preparation of the polycarbonate resins of the invention may be found in the incorporated reference, U.S. Pat. No. 4,269,964.

The impact modifiers in the present context may be any of the known rubber-elastic polymers which may optionally be grafted. Essentially all rubber-elastic polymers having a glass transition temperature below 0° C. are suitable in the present context. Examples of suitable impact modifiers are styrene butadiene copolymers such as Philips' K-resin or Solprene resins; styrene/butadiene/caprolactone copolymers; selectively hydrogenated elastomeric block copolymers of styrene and butadiene such as Krayton-G 1650 and as taught, for instance, in U.S. Pat. No. 4,122,131; polyolefins such as polyethylene, polypropylene, copolymers of ethylene and propylene, ethylene propylene diene (EPDM) rubber, such as Nordel® from DuPont, copolymers of ethylene and a $C_1$–$C_{16}$ alkylacrylate; also, polyolefins containing reactive functional groups such as carboxyl (—COOH), carboxylate salts (—COO—Na), sulfonic acid (—$SO_3H$), or sulfonic acid salts, such as —$SO_3Na$ and the like; also olefin based terpolymers, ethylene-butadiene copolymers, propylene-butadiene copolymers, ethylene-acrylic acid copolymers, propylene-acrylic acid copolymers, ethylene-vinyl acetate copolymers and ethylenepropylene-acrylic acid terpolymers; also linear acrylate rubbers such as poly-n-butylacrylate or linear acrylate copolymers such as poly-n-butyl-2-hydroxyethylacrylate; polyurethane thermoplastic elastomers such as block copolymers of methylenediisocyanate (MDI) and hydroxyl terminated polyol (1,4-butyleneadipate); silicone rubbers such as polydimethylsiloxane or polymethylphenylsiloxanes and the like; ethylene methacrylate copolymers as are exemplified by EMA-2205 a product of Gulf Chemical Corporation are also suitable; also suitable as modifiers are graft polymers such as are known in the art and which are obtained by the polymerization of monomers in the presence of prepolymers to cause grafting of a substantial portion of the monomers onto the prepolymer molecules. The preparation of graft copolymers has been described in R. J. Ceresa, "Block and Graft Copolymers" (Butterworth, London, 1962), incorporated by reference herein. In the preparation of the suitable grafts the prepolymer may comprise acrylate, methacrylate or butadiene rubbers and include acrylate of $C_1$–$C_{15}$ alcohol, polybutadiene, butadiene styrene, butadiene acrylonitrile copolymers, acrylonitrile butadiene styrene, ethylene-propylene rubbers, polyisobutene, polyisoprene and polyethylene. Among the grafts are included acrylic or methacrylic esters of saturated aliphatic alcohols, vinyl acetate, acrylonitrile and styrene.

Further suitable modifiers are described in U.S. Pat. Nos. 3,919,353, 4,022,748, 3,808,180, 3,280,219 and British Pat. Nos. 1,124,911 and 1,374,839, all incorporated herein by reference.

The preferred impact modifier is an acrylic rubber interpolymer composite. Acrylic rubber interpolymer composites are described in U.S. Pat. Nos. 3,808,180 and 4,096,202, both incorporated by reference herein. Briefly, the technology described therein is that of the preparation of a specific class of multiphase compounds. These are compositions comprising about 25 to 95% by weight of a first elastomeric phase and about 75 to 5% by weight of a second, rigid thermoplastic phase. The first phase is polymerized from about 75 to 99.8% by weight $C_1$ to $C_6$ acrylate resulting in an acrylic rubber core having a glass transition temperature below about 10° C. which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include triallyl cyanurate, polyacrylic and polymethacrylic esters of polyols such as butylene diacrylate and dimethacrylate trimethylol propane trimethacrylate and the like; di- and trivinyl benzene, vinyl acrylate and methacrylate and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and, consequently, at or near the surface of the elastomer particles. The preferred graft-linking monomer is allyl methacrylate and diallyl maleate.

The final stage monomer system can be comprised of $C_1$ to $C_{16}$ methacrylate, styrene, acrylonitrile, alkyl acrylates, alkyl methacrylate, dialkyl methacrylate and the like, as long as the over Tg is at least 20° C. Preferably, the final stage monomer system is at least 50 weight % $C_1$ to $C_4$ alkyl methacrylate. It is further preferred that the final stage polymer be free of units which tend to degrade polycarbonate, for example, acid, hydroxylamino and amide groups.

A certain such acrylic rubber interpolymer composite characterized in that the acrylic rubber core is comprised of n-butyl acrylate and in that its cross-linking agent is 1,3-butylene diacrylate and in which the graft-linking agent is diallyl maleate and the second phase monomeric system of which is methyl methacrylate was discovered to have an unexpected and profound effect on the impact performance of the alkylphenyl terminated polycarbonate resins of the present invention.

Further preferred modifiers are ABS resins and methacrylate-butadiene-styrene (MBS rubbers) exemplified by Acryloid KM-653, a product of Rohm & Haas Co.

Considerable improvement of the impact performance, manifested by an increase of the critical thickness which is indicative of a favorable shift in the ductile to brittle transition region, is obtained according to the invention by blending the polycarbonate resin of the invention with relatively small amounts of an acrylic rubber interpolymer compound.

The improved level of impact performance of the compositions of the present invention is obtained without resort to any additional impact modifiers.

Significantly, the invention represented herein resides in the desirable combination of high melt flow—conducive for processing—and improved impact performance, a combination not generally shared by other polycarbonate compositions.

In the context of the invention the composition comprising the alkylphenyl terminated polycarbonate resin is blended upon melting with the impact modifier. Such blending may be carried out in any of kneaders, extruders and similar equipment known and used in the art for preparing homogeneous blends of polymeric materials.

The amount of the impact modifier useful in the context of the invention is between about 1 and about 15%, preferably between about 1 and about 10%, relative to the weight of the polycarbonate resin.

EXAMPLES

EXAMPLE 1

The compositions according to the present invention were prepared by extrusion blending (2.75:1 screw with mixing pins, 50–75 rpm, temperature profile: 300°, 300°, 280°, 280°, 290° C.). Test specimens were injection molded and their properties determined as shown in Table 1. Acryloid ® KM-330 is an acrylic rubber interpolymer composite, a product of Rohm and Haas Company, Philadelphia, Pa. Merlon M-39 used in the comparative examples is a phenol terminated polycarbonate resin available from Mobay Chemical Corporation of Pittsburgh, Pa. The alkylphenol terminated, bisphenol A based polycarbonate resin was prepared in accordance with the procedure described above, and is characterized by its properties as listed in Table 1. For the purpose of comparison, the control samples were subjected to reextrusion to equalize their thermal histories with those of the blends.

TABLE 1

| | Additive[1] % | Melt[2] Flow | Impact Performance | | |
|---|---|---|---|---|---|
| | | | $\frac{1}{8}''$[3] | $\frac{1}{4}''$[3] | c · t[4] |
| Polycarbonate[5] | — | 18.6 | 14.34 | 2.14 | 175 |
| resin | 1.0 | 18.0 | 13.75 | 2.78 | 195 |
| (alkylphenol | 3.0 | 17.9 | 13.46 | 14.59 | >255 |
| terminated) | 5.0 | 15.8 | 13.36 | 11.41 | >258 |
| Polycarbonate | — | 14.8 | 14.86 | 1.99 | 165 |
| resin | 1.0 | 14.9 | 15.01 | 2.34 | 185 |
| (phenol terminated) | 3.0 | 14.5 | 14.75 | 13.73 | >256 |
| | 5.0 | 13.1 | 14.39 | 11.90 | >256 |
| Polycarbonate resin | — | 19.5 | 14.19 | 1.76 | 125 |
| (phenol terminated) | 1.0 | 19.1 | 14.21 | 2.10 | 135 |
| | 3.0 | 18.8 | 13.12 | 4.25 | 215 |
| | 5.0 | 17.0 | 12.73 | 10.28 | >256 |

[1]Acryloid KM-330
[2]Per ASTM D-1238 at 300° C., gm/10 min.
[3]Notched Izod per ASTM D-256, ft.lb/in.
[4]Critical thickness (mils), Mobay method.
[5]P-tert-octylphenol terminated polycarbonate resin.

EXAMPLE 2

In much the same fashion as was described above, the compositions according to the invention comprising octylphenol terminated polycarbonate and a modifier of the MBS type (Acryloid KM-653) were prepared and their properties shown in Table 2. An additional series of compositions entailing an ethylene methacrylate copolymer as an impact modifier was prepared and its properties shown in the same table.

TABLE 2

| Polycarbonate Type | Impact Modifier | | Izod Impact Strength, Notched (ft.lb/in.) | |
|---|---|---|---|---|
| | Type | Amount (%) | $\frac{1}{8}''$ | $\frac{1}{4}''$ |
| PTOP[1] | MBS[3] | 2.0 | 13.50 | 4.12[B] |
| PTOP | MBS | 3.0 | 13.30 | 5.51[B] |
| PTOP | MBS | 4.0 | 12.67 | 9.89[D] |
| Phenol[2] terminated | MBS | 2.0 | 13.80 | 2.80[B] |
| Phenol terminated | MBS | 3.0 | 12.62 | 4.30[B] |
| Phenol terminated | MBS | 4.0 | 11.80 | 6.49[B] |
| PTOP | EMA[4] | 2.0 | 13.92 | 4.29[B] |
| PTOP | EMA | 3.0 | 14.10 | 10.90[D] |
| PTOP | EMA | 4.0 | 13.40 | 10.70[D] |
| Phenol terminated | EMA | 2.0 | 14.60 | 3.35[B] |
| Phenol terminated | EMA | 3.0 | 13.00 | 4.63[B] |
| Phenol terminated | EMA | 4.0 | 13.99 | 11.50[D] |

[1]PTOP is a p-tert-octylphenol terminated polycarbonate having a melt flow index of 18.8 gm/10 min.
[2]A phenol terminated, polycarbonate resin having a melt flow rate of 19.2 gm/10 min.
[3]Acryloid KM-653
[4]EMA 2205
[B]Brittle failure
[D]Ductile failure An analysis of the results tabulated above point to that the incorporation of the impact modifiers of the invention in the alkylphenyl terminated polycarbonates brings about a surprising combination of a high level of impact strength and high melt flow conducive for processing.

Although the invention has not been described with reference to specific materials, the invention is to be limited only so far as is set forth in the claims.

What is claimed is:
1. A composition comprising
   (a) a polycarbon resin characterized in that its end groups are residues of

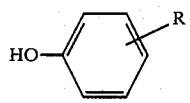

wherein R denotes a branched alkyl radical of 8 or 9 carbon atoms and in the alkyl radical the proportion of CH$_3$ protons is between 47% and 89% and the proportion of the sum of the CH and CH$_2$ protons is between about 53% and 11% and wherein R is in either the ortho or para position relative to the OH group, the upper limit of the ortho proportion being about 20%, and
   (b) an impact modifier consisting of a rubber elastic polymer having a glass transition temperature below 0° C., said composition further characterized in that its melt flow rate per ASTM D-1238 at 300° C. is about 15 to about 19 gm/10 min. and in that said impact modifier is present at an amount of about 1 to 3 percent relative to the weight of said polycarbonate resin.

2. The composition of claim 1 wherein said impact modifier is an acrylate graft polymer.

3. The composition of claim 2 wherein said acrylate graft polymer is a multiphase composite interpolmer comprising
   (a) about 25 to 95 percent by weight of a first elastomeric phase polymerized from a monomer system comprising about 75 to 99.8 percent by weight of C$_1$-C$_6$ arcylate, 0.1 to 5 percent by weight crosslinking member, 0.1 to 5 percent by weight graftlinking monomer, and
   (b) about 75 to 5 percent of a second rigid thermoplastic phase polymerized in the presence of said elastomeric phase.

4. The composition of claim 3 wherein said cross-linking member is 1,3-butylene diacrylate, said graft-linking member is diallyl maleate and said second rigid thermoplastic phase is methyl methacrylate.

5. The composition of claim 1 wherein said impact modifier is a graft polymer wherein prepolymer is selected from the group consisting of acrylate methacrylate and butadiene rubbers.

* * * * *